United States Patent [19]

Feuling

[11] Patent Number: 5,039,336

[45] Date of Patent: Aug. 13, 1991

[54] RECOVERY OF SCANDIUM, YTTRIUM AND LANTHANIDES FROM ZIRCON SAND

[75] Inventor: Robert J. Feuling, Sandy, Utah

[73] Assignee: Westinghouse Electric Corp., Pittsburgh, Pa.

[21] Appl. No.: 292,035

[22] Filed: Dec. 30, 1988

[51] Int. Cl.$^5$ .................... C22B 34/14; C01F 17/00
[52] U.S. Cl. ................................ 75/419; 75/618; 423/21.1; 423/79
[58] Field of Search ............ 75/419, 618; 423/21.1, 423/79

[56] References Cited

U.S. PATENT DOCUMENTS 2,931,705  4/1960  Girardot ........................ 423/74

FOREIGN PATENT DOCUMENTS 866416  9/1981  U.S.S.R. .......................... 423/21.1

Primary Examiner—Melvyn J. Andrews
Attorney, Agent, or Firm—Z. L. Dermer

[57] ABSTRACT

This is a process for extracting scandium from zircon ore. It utilizes feeding zircon sand to a fluidized bed chlorinator at about 1000° C. to produce a vaporous (principally zirconium and silicon chlorides) phase and a solid residue and recovering scandium from the solid residue. Surprisingly, despite the relatively low sublimation temperature of scandium chloride the very low level of scandium present in zircon ore is concentrated in the residue (rather than going with the vapor phase, where it would not be concentrated), making recovery of scandium from the zircon ore economically feasible. Generally, the process can be part of the production of zirconium metal, whereby scandium is a byproduct of zirconium production. Preferably, the recovery is performed by leaching the residue with aqueous acid (e.g. HCl) to produce a scandium-containing aqueous solution, followed by contacting the aqueous solution with a polyalkyl phosphate-containing organic phase, the polyalkyl phosphate (e.g. tributyl phosphate) extracting scandium into the organic phase, followed by scandium precipitation by an ammonium addition to produce a scandium hydroxide precipitate and the scandium hydroxide is calcined, whereby scandium is recovered as an oxide. The residue generally also contains yttrium and lanthanides, and the yttrium and lanthanides can also be recovered from the residue as a part of the scandium recovery process. The recovering of the scandium chloride from the residue can also be performed by leaching the residue with alcohol (preferably methanol) to produce a scandium-containing alcohol solution (the remaining residue can then be recycled to the chlorinator). The leaching with alcohol can be followed by contacting the alcohol solution with oxalic acid to precipitate oxalates of scandium, thorium, and lanthanides.

15 Claims, 1 Drawing Sheet

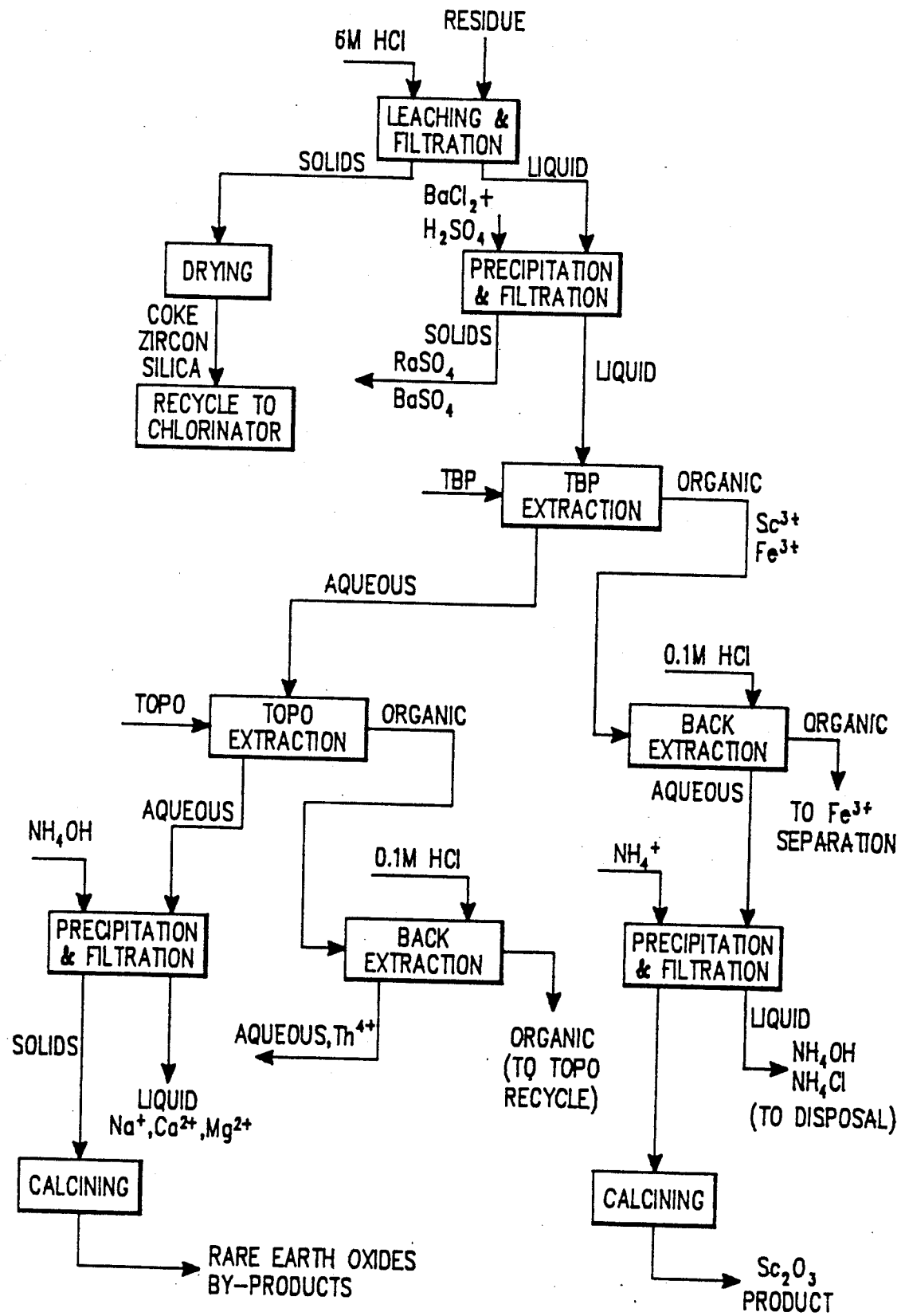

RECOVERY OF SCANDIUM, YTTRIUM AND LANTHANIDES FROM ZIRCON SAND

CROSS-REFERENCE TO RELATED APPLICATIONS

Copending application Ser. No. 07/268,101, filed Nov. 9, 1988, now U.S. Pat. No. 4,902,655 teaches the removal of uranium (along with iron removal) prior to zirconium-hafnium separation. Iron has previously been removed by methyl isobutyl ketone, and that invention utilizes the addition of about 5% quatenary ammonium halide to also remove uranium, at the same time.

Copending application Ser. No. 121,012, filed Nov. 16, 1987, now U.S. Pat. No. 4,902,655 teaches a fabrication process to convert lanthanide ores into metal alkoxide precursors for advanced ceramics. It utilizes fluidized bed chlorination of a lanthanide ore followed by separation of at least one high value rare earth as a by-product, with the remaining rare earth mixture being processed into alkoxides and blended with zirconium alkoxide for fabrication of zirconium ceramic.

Related application Ser. No. 121,016, filed Nov. 16, 1987, now U.S. Pat. No. 4,900,536, teaches fluidized bed chlorination of lanthanide ore, a separation of a chloride of the rare earth superconducting component from other rare earth chlorides, reacting the rare earth superconducting component chloride to produce the alkoxide and mixing with alkoxides of other non-oxygen constituents of the superconductor to produce an alkoxide composite for processing into a superconductor.

BACKGROUND OF THE INVENTION

Scandium has apparently never been recovered from zircon ore. While there are scandium ores, such ores are rare (as noted in U.S. Pat. No. 2,874,039, to Pruvot et al., which discloses a process for extraction of scandium from thorveitite ore). The separation of rare earths from ores by leaching (including with hydrochloric acid in one instance) is discussed in U.S. Pat. Nos. 2,722,471 (to Hirsch et al), 3,812,233 (to Duncan), and 2,735,747 (to Kasey). The separation of rare earths from thorium (including in acid leach liquors in one instance) is discussed in U.S. Pat. Nos. 2,990,244 (to Brown et al), 3,159,452, (to Lerner), and 3,087,148 (to Carter et al). The reduction of scandium chloride to metal is discussed in U.S. Pat. 2,941,867 (to Maurer).

Zircon ore is used for the production of zirconium metal. The converting of zircon ore (zircon sand) to zirconium metal generally utilizes the following operations: chlorination, separation (to remove hafnium), rechlorination (by processing similar to the initial chlorination), reduction, distillation (magnesium chloride and Mg vaporization for their removal from the zirconium), and double (or triple) arc melting to produce an ingot. The zirconium ingot can be then fabricated into various shapes.

With regard to chlorination, U.S. Pat. No. 4,244,935, issued to Dell on Jan. 13, 1981, relates a method of forming the chloride of a metal-oxygen containing substance based on a fluid coking technique. It should be noted that the commercial process for making zirconium metal utilizes a fluidized bed carbochlorination process at about 1000° C. (temperature across the bed apparently varies up to 200° C. or so), which produces a relatively impure, hafnium-containing zirconium tetrachloride and by-product silicon tetrachloride (which silicon tetrachloride by-product is relatively easily separated by differential condensation). U.S. Pat. No. 3,895,097, issued to Langenhoff et al. on July 15, 1975, also relates to a process for reacting metal oxides with chlorine.

The separation step is required as naturally occurring zirconium ores generally contain from 1 to 3 percent hafnium oxide relative to zirconium oxide. In order that the zirconium metal be acceptable as a nuclear reactor material, the hafnium content must first be reduced to low levels to minimize the effect of the high neutron absorption cross section of hafnium. This separation process is difficult due to the extreme chemical similarity of the two elements. A number of techniques have been explored to accomplish this separation, with the technique currently in use in the United States involving liquid-liquid extraction of aqueous zirconyl chloride thiocyanate complex solution using methyl isobutyl ketone, generally as described in U.S. Pat. No. 2,938,679, issued to Overholser on May 31, 1960, with the removal of iron impurities prior to solvent extraction as described in U.S. Pat. No. 3,006,719, issued to Miller on Oct. 31, 1961.

Commercially, reduction is by reacting gaseous zirconium tetrachloride with molten magnesium to produce zirconium metal (in relatively porous, so-called "sponge", form). Modifications to the reduction process have been suggested in many U.S. Pat. Nos. , including 4,440,384; 4,511,399; 4,556,420; 4,613,366; 4,637,831 and assigned to the same assignee.

With regard to "distillation" to remove magnesium chloride and Mg (by their vaporization) from the zirconium sponge, such distillation is usually performed at about 1050–1100° C. (note, however that Kwon et al. in U.S. Pat. No. 4,711,664 teach that iron content can be lowered by distilling at about 934° C.).

Consumable electrode vacuum arc melting is generally used to produce a consolidated ingot from the porous distilled sponge (generally the distilled sponge is broken up and then pressed into disks, for example, which disks are then welded together to form the consumable electrode. An improved consumable electrode is described in Weber's U.S. Pat. No. 4,539,688.

Recovery of materials from waste streams, is, of course, desirable. For example, Naitou et al. in U.S. Pat. No. 4,650,652, issued Mar. 7, 1987, describe a process for recovering high purity rare earth oxides from a waste rare earth phosphor (the process utilizes dissolving waste rare earth phosphor in an excess amount of acid, adding oxalic acid to obtain precipitates of rare earth oxylates, washing precipitates and baking precipitates).

SUMMARY OF THE INVENTION

This is a process for extracting scandium from zircon ore. It utilizes feeding zircon sand to a fluidized bed chlorinator at 800°–1250° C. to produce a vaporous (principally zirconium and silicon chlorides) phase and a solid residue and recovering scandium from the solid residue. The very low level of scandium present in zircon ore is concentrated in the residue, making recovery of scandium from the zircon ore economically feasible.

Preferably, the process is part of the production of zirconium metal, whereby scandium is a by-product of zirconium production.

The scandium is generally present in the residue principally as scandium chloride and the recovering of the scandium chloride from the residue is preferably performed by leaching the residue with aqueous acid (e.g. HCl) to produce a scandium-containing aqueous solution; and contacting the resultant aqueous solution with a polyalkyl phosphate-containing organic phase, the polyalkyl phosphate (e.g. tributyl phosphate) extracting scandium into the organic phase. Scandium can then be precipitated by an ammonium addition to produce a scandium hydroxide precipitate and the scandium hydroxide calcined, so that the scandium can be recovered as an oxide.

A process for extracting zirconium and scandium from zircon sand thus can comprise: feeding the zircon sand to a fluidized bed chlorinator at about 1000° C. (800°-1250° C.) to volatilize zirconium and silicon chlorides from the sand and to produce a residue containing a scandium compound and other solids; separating the scandium compound from the other solids of the residue; collecting the zirconium chloride; and processing the zirconium chloride to produce zirconium metal.

The residue generally also contains yttrium and lanthanides, and the yttrium and lanthanides can also be recovered from the residue, either by leaching yttrium and lanthanides with the acid along with the scandium into the scandium-containing aqueous solution (in which case the yttrium and lanthanides can be precipitated by an ammonium addition along with the scandium and the yttrium and lanthanides are calcined and recovered with the scandium) or by contacting the aqueous solution with a polyalkyl phosphate-containing organic phase to produce a scandium-containing organic phase and a yttrium and lanthanide-containing aqueous phase. In the latter case, by calcining the organic phase, scandium is recovered as an oxide, and by separately calcining the aqueous phase, yttrium and lanthanides are also recovered as oxides.

The recovery of the scandium chloride from the residue can also be performed by leaching the residue with alcohol (preferably methanol) to produce a scandium-containing alcohol solution. The remaining residue can then be recycled to the chlorinator. Generally, the leaching with alcohol can be followed by contacting the alcohol solution with oxalic acid to precipitate oxalates of scandium, thorium, and lanthanides, and thus purified chlorides of scandium, thorium, and lanthanides are obtained. The alcohol can be distilled and recycled back to the leach step.

BRIEF DESCRIPTION OF THE DRAWINGS

The invention as set forth in the claims will become more apparent by reading the following detailed description in conjunction with the accompanying drawing which generally shows where the constituents of the residue go during processing and in which:

The sole Figure is a process flow diagram of an embodiment where aqueous leaching is used and scandium is recovered separately from the lanthanides.

DESCRIPTION OF THE PREFERRED EMBODIMENTS

As noted, scandium ores are relatively rare. Scandium is a generally found in the lanthanide ores (the term "rare earth" is generally used for the lanthanides, and the term is sometimes used as including yttrium, and, on rare occasions, has also been used as also including scandium; as used herein, "rare earth" will be used to include yttrium, but not scandium). Significant scandium enrichment, however, has apparently not been observed in rare earth ores and apparently has never been found in substantial quantity in any ore deposit. Scandium's scarcity has resulted in a very high cost which has limited the usage of scandium.

In contrast to many other industrial minerals, zircon sand is a rather pure mineral. The total impurity content is only about 1% (zircon sand is about 99% zirconia, hafnia, and silica). Of the impurities present, most have volatile chlorides and pass into the vapor stream with the zirconium-hafnium tetrachloride and the silicon-tetrachloride. About 2,000 ppm of impurities do not have volatile chlorides and are concentrated in the residue of the ore chlorinators (typically called the "crude chlorinators"). The non-volatile chlorides generally are of alkali metals, such as sodium, the alkaline earth metals, such as calcium and the rare earths. Surprisingly, despite the 1,000° C. nominal operating temperature of the chlorinator and the 800-850° C. sublimation temperature of scandium chloride I have found that most of the scandium remains with the non-volatile residue. Note also that scandium chloride should have significant vapor pressure even below 800° C., and thus it is unclear why the scandium chloride remains in the residue; perhaps the scandium chloride vapor pressure is lowered by formation of some double salt with some other non-volative chloride.

It should be noted that thorium is non-volatile at chlorinator conditions and thorium and its decayed product radium also accumulate in the residue with the radium giving the residue a radioactivity of about 4,000 picocuries per gram. Because of the concentration effect of removing the major portion of the ore, the thorium and radium level in the material is such that the residue must be disposed of as low level radioactive wastes.

In the operation of such fluid bed chlorinators, it is necessary to keep the bed from accumulating more than about 10% non-volatile chlorides, as these chlorides are generally liquid at the temperature the chlorinator, and the bed becomes "sticky" and will not "fluidize" properly as the salts accumulate. When a chlorinator is shut down because the accumulation of non-volatile chlorides, the bed typically contains about 70% coke carbon 20% zircon, and about 10-12% non-volatile chlorides. In the past, the disposal costs of such residue has been in excess of $100,000. If the bed at shutdown were all non-volatiles, there would be about 500:1 concentration, but as it is only about 10-12%, the concentration is about 50:1-60:1.

Although analytical results indicate that the scandium content of the residue is only about 0.0065%, my calculations indicated that if the scandium remained with the residue, the scandium should be about 0.4% of the residue. Experimental separations of scandium using the process of this invention, have recovered scandium in amounts of about 0.34% of the residue.

As the residue also contains rare earths (lanthanides and yttrium, especially lutetium and thulium), these elements can also be recovered from the residue as a by-product of scandium recovery. In addition, during the processing of the residue for scandium, (and generally rare earths as well) it is preferable also to remove thorium and radium both to keep them out of the products, and to avoid disposal problems of radioactive residue.

In the following examples, Example I illustrates the leaching of residue and the production of four separate streams containing scandium, rare earths, radium, and thorium. The Example II illustrates the obtaining of only two streams, one with radium and the second with the scandium, yttrium, lanthanides and thorium.

EXAMPLE I

Zircon sand was chlorinated according to current commercial practice (nominally 1000° C.), but the crude chlorinator residue so obtained was leached for 24 hours with 6M HCl without external heating. (1 Kg residue/liter 6M HCl.) The leach solution was filtered. The leached solid was dried at 120° C. and recycled through the chlorination system. The leach solution was treated with $BaCl_2$ to 0.001M and $H_2SO_4$ to 0.001M. The solution was filtered to remove Ra as carried on $BaSO_4$. The filtered solution was contacted wrth TBP (tributyl Phosphate) to selectively extract scandium. The TBP solution is back-extracted with 0.1M HCl. The scandium-depleted aqueous phase was contacted with TOPO/Hexane (Trioctyl Phosphine Oxide) to selectively extract Th. The thorium was back-extracted with 0.1M HCl. These extractions may be single partition or counter-current depending on the degree of separation desired. The remaining Sc, Th, Ra free solution, containing lanthanide elements and yttrium was treated with $NH_3$ (aq) to pH 10 and filtered. The lanthanide hydroxides are calcined at 600° C. to yield oxides. The thorium and scandium back-extracts were converted to oxides in the same manner as the lanthanide solution. The scandium sample was greater than 99° pure $Sc_2O_3$ and was 0.34 by weight of the residue. The sole Figure is a flow diagram of this Example.

EXAMPLE 2

Mixed oxides of Sc, Y, lanthanides and Th, can be obtained by following Example 1 through filtration of $BaSO_4$. The filtered solution can be treated with aqueous ammonia to pH 10, filtered and the mixed hydroxides calcined at 600° C.

While the scandium could be recovered from zircon ore by this process, it is of course best performed as a part of the production process for the zirconium metal, with the scandium being recovered from the crude chlorinator residue (which residue had previously been disposed of at low level radioactive waste disposal sites). Preferably rare earths and thorium and radium will be separately recovered as additional by-products. Thus, the process will lower the costs of residue removal by concentrating radioactive elements into small volume marketable form; will allow recycling of some components (carbon and zircon, without the "sticky" non-volatile chlorides, zirconium chloride is also recycled if separation is by an alcohol leach) of the residue back into the crude chlorinator feed; and will recover by-products of substantial value (especially scandium, lutetium and thulium, generally in oxide form at about 0.4%, 0.25% and 0.2% of residue weight respectively).

While the preferred embodiments described herein set forth the best mode to practice this invention presently contemplated by the inventor, numerous modifications and adaptations of this invention will be apparent to others skilled in the art. Therefore, the embodiments are to be considered as illustrative and exemplary and it is understood that numerous modifications and adaptations of the invention as described in the claims will be apparent to those skilled in the art. Thus, the claims are intended to cover such modifications and adaptations as they are considered to be within the spirit and scope of this invention.

I claim:

1. A process for extracting scandium from ore comprising zirconium silicate; said process comprising:
   a. feeding scandium-containing zircon ore to a fluidized bed chlorinator at 800°–1250° C. to produce a vaporous phase, said vaporous phase principally comprising zirconium and silicon chlorides, and to produce a solid scandium-containing residue; and
   b. recovering the scandium as a compound from said solid residue, whereby the very low level of scandium present in zircon ore is concentrated in the residue, making recovery of scandium from the zircon ore economically feasible.

2. The process of claim 1, wherein said zirconium chloride in said vaporous phase is separated from said silicon chloride in said vaporous phase after said vaporous phase is separated from said scandium-containing residue, and is then processed into zirconium metal.

3. The process of claim 1, wherein said scandium is present in said residue principally as scandium chloride and said recovering of said scandium chloride from said residue is performed by leaching said residue with aqueous acid to produce a scandium-containing aqueous solution.

4. The process of claim 3, wherein said acid is HCl.

5. The process of claim 3, wherein said leaching with acid is followed by contacting said aqueous solution with a polyalkyl phosphate-containing organic phase, said polyalkyl phosphate extracting scandium ions into said organic phase.

6. The process of claim 5, wherein said acid is HCl and said polyalkyl phosphate in said organic phase is tributyl phosphate.

7. The process of claim 5, wherein after said extracting of scandium into said organic phase, scandium is precipitated by an ammonium addition to produce a scandium hydroxide precipitate and said scandium hydroxide is calcined, whereby scandium is recovered as an oxide.

8. A process for extracting zirconium and scandium from zircon sand; comprising silica said process comprising:
   a. feeding scandium-containing zircon sand to a fluidized bed chlorinator at 800°–1250° C. to volatilize zirconium and silicon chlorides from said sand and to produce a residue containing a scandium compound and other solids;
   b. separating said scandium-compound from the other solids of said residue;
   c. separating said zirconium chloride from said silicon chloride; and
   d. reducing said zirconium chloride to produce zirconium metal.

9. The process of claim 8, wherein said scandium compound is present in said residue as scandium chloride and said separating of said scandium chloride from said other solids is performed by leaching said residue with acid to produce an aqueous solution followed by contacting said solution with an organic phase to extract scandium into said organic phase, and by calcining said extracted scandium, whereby scandium is recovered as an oxide.

10. The process of claim 9, wherein said zircon sand contains yttrium and lanthanide which accumulate in said residue, and said yttrium and lanthanides are also recovered from said residue.

11. The process of claim 10, wherein said yttrium and lanthanides are leached by said acid with said scandium into said scandium-containing aqueous solution, said yttrium and lanthanides are precipitated as mixed hydroxides by an ammonium addition along with said scandium and said yttrium and said lanthanide mixed hydroxides are calcined and recovered with said scandium.

12. The process of claim 10, wherein said yttrium and lanthanides are leached by said acid with said scandium into said scandium-containing aqueous solution, which leaching is followed by contacting said aqueous solution with a polyalkyl phosphate-containing organic phase, to produce a scandium-containing organic phase and a yttrium and lanthanide-containing aqueous phase, and then by calcining said extracted scandium, whereby scandium is recovered as an oxide, and by calcining said aqueous phase, whereby yttrium and lanthanides are recovered as oxides.

13. The process of claim 12, wherein said scandium is present in said residue principally as scandium chloride and said recovering of said scandium chloride from said residue is performed by leaching said residue with alcohol to produce a scandium-containing alcohol solution.

14. The process of claim 13, wherein said alcohol is methanol and the remaining residue is recycled to said chlorinator.

15. The process of claim 13, wherein said zircon sand contains thorium and iron which accumulate in said residue and said leaching with alcohol is followed by contacting said alcohol solution with oxalic acid to precipitate chlorides of scandium, thorium, and lanthanides, and to retain chlorides of zirconium, silicon, and iron in said alcohol solution, whereby purified chlorides of scandium, thorium, and lanthanides are obtained.

* * * * *